United States Patent Office 2,895,743
Patented July 21, 1959

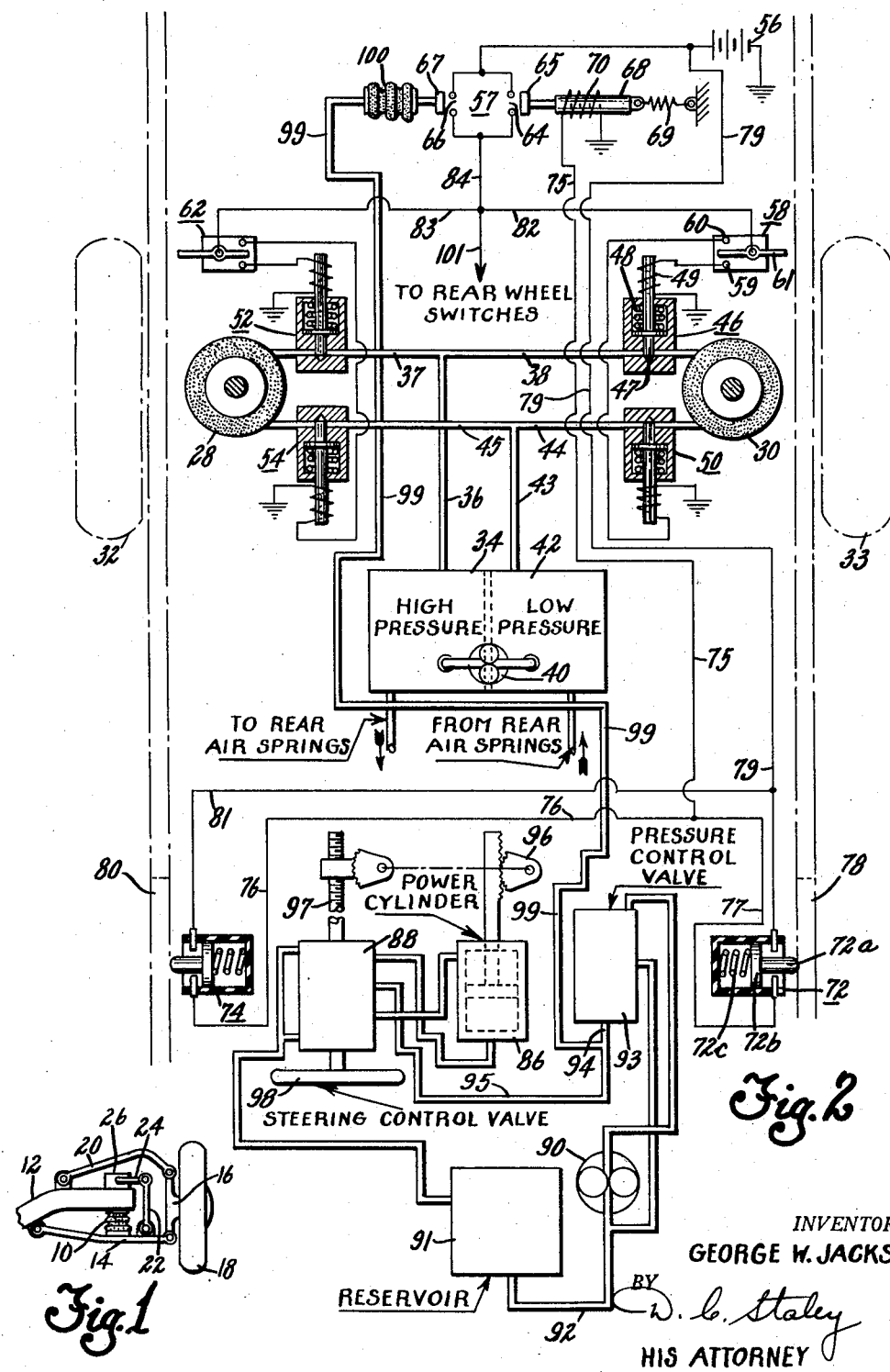

2,895,743

CONTROL APPARATUS FOR FLUID SPRING SUSPENSION

George W. Jackson, Dayton, Ohio, assignor to General Motors Corporation, Detroit, Mich., a corporation of Delaware Application June 18, 1956, Serial No. 592,150

7 Claims. (Cl. 280—124)

This invention relates to a suspension system for a motor vehicle and more particularly to a system wherein bellows-type fluid springs are connected between the axle and frame of a motor vehicle.

An object of the invention is to provide fluid springs that are connected between the sprung and unsprung parts of a motor vehicle, together with control means for controlling the supply of fluid to and the exhaust of fluid from the fluid springs.

Another object of this invention is to provide solenoid operated valves for controlling the supply and exhaust of fluid to and from fluid springs connected between the frame and axle of a motor vehicle, the solenoid valves being energized by a suitable electrical supply through a switch that is actuated in response to a change in the vertical distance between the frame and axle of the motor vehicle.

Still another object is to provide control means for a motor vehicle fluid spring, the control means being rendered ineffective to control the supply or exhaust of fluid to and from the spring when the doors of the vehicle are closed, and being rendered effective when the vehicle doors are open.

A further object is to provide control means for a motor vehicle fluid spring, the control means being rendered effective when the wheels of the vehicle are turned in making a turn, and being rendered ineffective when the vehicle wheels are positioned for straight-ahead movement of the motor vehicle.

Still another object is to provide control means for a motor vehicle fluid spring, the control means being rendered effective to control the supply or exhaust of fluid to and from the spring in response to an increase of fluid pressure in a power steering system associated with the motor vehicle, and being rendered ineffective under low pressure operation of the power steering system when the motor vehicle is being steered straight ahead.

Further objects and advantages of the present invention will be apparent from the following description, reference being had to the accompanying drawings wherein a preferred form of the invention is clearly shown.

In the drawings:

Figure 1 is a front view of a frame and wheel assembly showing the connection of the fluid spring with the frame and axle of a motor vehicle; and Figure 2 is a schematic illustration of the control system for the fluid springs of this invention.

The fluid springs of this invention are connected between the frame and axle of the motor vehicle, the frame being a sprung part and the axle being an unsprung part of the motor vehicle, for cushioning the shock between these parts and for maintaining a predetermined vertical distance between the sprung and unsprung parts. A preferred connection for the fluid spring is shown in Fig. 1 where a bellows type air spring 10 is connected between the frame 12 and lower control arm 14 of a motor vehicle. The bellows is made of any suitable material that will contain a quantity of air or other liquid. The control arm 14 is connected with an axle 16 of the motor vehicle which supports a wheel 18. An upper control arm 20 is connected between the frame 12 and axle 16. With this arrangement the height of the frame 12 above ground level or the vertical distance between the frame and axle may be regulated and maintained by controlling the fluid pressure within bellows 10. The frame 12 may be termed a sprung part of a motor vehicle, while the control arms 14 and 20, the axle 16, and the wheel 18 may be termed unsprung parts of the motor vehicle. It will be apparent that the bellows 10 need not necessarily be connected as shown in Fig. 1, but may be connected between any unsprung part and any sprung parts of the motor vehicle.

A switch actuating link 22 is connected to lower control arm 14 and to an arm 24 that is connected to an electrical switch, designated by reference numeral 26. The switch 26, as will more fully appear hereinafter, controls the supply or exhaust of fluid to and from the bellows 10 to maintain a certain predetermined vertical distance between the frame and axle of the motor vehicle. Thus, when the motor vehicle is heavily loaded, the bellows 10 is compressed and the frame 12 and axle 16 move vertically toward one another. This relative movement between frame 12 and axle 16 moves link 22 and arm 24 relative to switch 26, thereby actuating the switch 26 in one direction. On the other hand, when the vehicle is lightly loaded, the switch 26 is actuated in an opposite direction. When the frame 12 and axle 16 are spaced a certain desired predetermined distance and when the frame is spaced a certain predetermined distance from ground level, the switch 26 is not actuated and fluid is neither supplied to nor exhausted from bellows 10. It is to be understood that the mechanism shown in Fig. 1 is associated with each front wheel of the motor vehicle, and that fluid springs are connected between the frame and rear axle of the vehicle adjacent each rear wheel.

A preferred control apparatus for the fluid and spring suspension of this invention is illustrated schematically in Fig. 2. In this figure, a pair of expansible bellows-type fluid springs 28 and 30 are shown adjacent the front wheels 32 and 33 of the motor vehicle. The bellows 28 and 30 are associated with the frame and axle of the motor vehicle in a manner shown in Fig. 1. It is to be understood that the rear wheels (not shown) are also provided with a fluid spring bellows arrangement connected between the rear axle and frame of the vehicle. The bellows 28 and 30 are preferably supplied with compressed air from a high pressure reservoir 34 via pipe 36 and pipes 37 and 38. The reservoir is supplied with compressed air by a compressor 40 that may be driven by the engine of the motor vehicle or in any other desired manner. The inlet side of the compressor is connected with a low pressure reservoir 42. The low pressure reservoir is connected to bellows 28 and 30 by fluid lines 43, 44 and 45. The supply of air to each bellows is controlled by a solenoid valve and the exhaust of fluid from each bellows to low pressure reservoir 42 is also controlled by a solenoid valve. Thus, a solenoid valve 46 is interposed in high pressure pipe 38 between the reservoir 34 and bellows 30. The solenoid valve comprises a valve plunger 47 that is spring-biased to a closed position by a spring 48. The valve plunger 47 may be moved to an open position by the energization of solenoid winding 49. A solenoid valve 50 identical with valve 46 is interposed in exhaust line 44. The fluid flow to and from the bellows 28 is controlled by a solenoid valve 52 located in high pressure pipe line 37 and by a solenoid valve 54 located in the exhaust line 45 of the system. The solenoid valves 52 and 54 are identical with solenoid valve 46, discussed above. It will be apparent from the foregoing that energization of solenoid valves 46, 50, 52 and 54 controls the supply and exhaust of high pressure air to and from the bellows 28 and 30.

The windings of solenoid valves 46 and 50 are connected in series with a battery 56, a switch, generally denoted by reference numeral 57, and with a leveling switch 58. The switch 58 is identical with switch 26, shown in Fig. 1, and has a pair of contacts 59 and 60. When the motor vehicle frame is at the desired predetermined height above ground level, the switch 58 remains in a neutral position, as shown in Fig. 2, and neither valve 46 nor valve 50 is energized. Should the motor vehicle become heavily loaded, switch arm 61 of switch 58 makes contact with contact 59 to energize valve 46. This placess the bellows 30 in communication with the high pressure reservoir 34, thus supplying air to bellows 30 to compensate for the extra loading and moving frame of the motor vehicle upwardly until the frame reaches the desired height above ground level. Conversely, when the vehicle is lightly loaded, the switch arm 61 makes contact with switch contact 60 thereby energizing solenoid valve 50 and placing the bellows 30 in communication with the low pressure reservoir 42. In this case the bellows 30 will exhaust air to the low pressure reservoir 42, thereby reducing the pressure in bellows 30 and permitting the frame 12 to move closer to ground level. It will be apparent to those skilled in the art that the switch 58 controls solenoid valves 46 and 50 to control the supply and exhaust of compressed air to bellows 30. The switch thus insures that the frame 12 will remain at a certain predetermined height above ground level, irrespective of the amount of load on the vehicle. The solenoid valves 52 and 54 are likewise connected in series with battery 56, switch 57, and with a leveling switch 62 that is in all respects identical with leveling switch 58. The leveling switch 62 cooperates with solenoid valves 52 and 54 in a manner identical with the cooperation of switch 58 with solenoid valves 46 and 50. It is thus apparent that leveling switch 62 together with solenoid valves 52 and 54, controls the supply and exhaust of air to bellows 23, thereby predetermining the height of frame 12 above ground level at the side of the vehicle adjacent wheel 32. As stated hereinbefore, the rear wheels of th vehicle ar also providd with leveling switches of a type identical with switches 58 and 62 and with solenoid valevs identical with valves 46 and 50.

It should be noted that the windings of solenoid valves 46, 50, 52 and 54 are also connected in series with contacts 64 and 66 of switch 57 that cooperate with contactors 65 and 67. As long as contacts 64 and 66 are open, there is no current supply to leveling switches 58 and 62 and consequently no current supply to any of the solenoid valves discussed above. The contactor 65 is connected with a plunger 68 and is normally held in an open position by a spring 69. The plunger 68 cooperates with a solenoid winding 70 which operates to move the contactor 65 into engagement with contacts 64 when the solenoid is energized. The solenoid 70 is connected in series with battery 56 and in series with door switches 72 and 74 via electrical lines 75, 76 and 77. The door switch 72 is provided with a plunger 72a and a contactor 72b, the plunger cooperating with a door 78 of the motor vehicle. When the door 78 is closed, the plunger is moved against the bias of a spring 72c to a position wherein contactor 72b is spaced from the contacts of the switch. When the door is moved to open position the spring moves the contactor 72b into bridging contact with the contacts of the switch 72 to complete a circuit to the battery for solenoid 79 via electrical line 79. The switch 74 is identical with switch 72 and remains in an open position when door 80 of the vehicle is closed, and moves to a closed position when the door 80 is in an open position. The switch 74 is connected to line 79 by an electrical line 81. It will thus be apparent that the opening of either door 78 or 80 completes a circuit for solenoid 70. Energization of solenoid 70 moves contactor 65 into engagement with contacts 64, thus connecting leveling switches 58 and 62 with battery 56 via electrical lines 82, 83 and 84. It can be seen from the foregoing that the solenoid valves 46, 50, 52 and 54 can only be energized through leveling switches 58 and 62 when the contacts 64 are bridged by contactor 65, and that this only takes place when one or more of the motor vehicle doors are in open position. In other words, the leveling switches 58 and 62 are only effective to control the supply or exhaust of fluid to and from bellows 28 and 30 when the doors are open. The leveling switches 58 and 62 are made active or inactive in response to the opening and closing of the doors of the motor vehicle because it is at this time that the load is changing on the motor vehicle, i.e. when passengers are getting in or moving out of the motor vehicle. Thus, as one of the doors of the motor vehicle is opened the leveling switches become effective and compensate for changes in load as a person enters or leaves the vehicle.

The motor vehicle is provided with a power steering system including a fluid motor 86, a steering control valve 88 and a pump 90. The pump 90 has its inlet connected to a reservoir 91 via fluid line 92 and has its outlet connected with a pressure control valve 93. The pressure control valve maintains a certain predetermined pressure in line 94 that is connected to steering control valve 88 via line 95. The fluid motor 86 is connected with a sector gear 96 of a conventional steering mechanism. The sector gear 96 is interconnected with a steering shaft 97 that is actuated by a steering wheel 98 of the motor vehicle. The power steering system is of a conventional type wherein movement of steering wheel 98 actuates control valve 88 to supply power fluid to one side or the other of the fluid motor 86 while exhausting power fluid from an opposite side. A fluid line 99 is connected with fluid line 94 that is connected with pressure control valve 93. One end of the fluid line 99 is connected with a switch actuating bellows 100 that operates to move contactor 67 into bridging relationship with contacts 66. The bellows 100 is so designated as to actuate contactor 67 when a predetermined pressure exists in fluid line 99. Thus, when steering wheel 98 is turned in making a turn, the pressure in line 94 increases in proportion to the load encountered by fluid motor 86 in turning the vehicle wheels. At some certain increase in pressure the bellows 100 moves contactor 67 to bridge contact 66. The bridging of contact 66 completes a circuit to leveling switches 58 and 62 and to solenoid valves 48, 50, 52 and 54 via electrical lines 82, 93 and 84. As long as the wheels of the motor vehicle are not turned and the motor vehicle is moving in a substantially straight line, the pressure in line 99 is not sufficient to close contacts 66. However, when the guiding wheels of the vehicle are turned to make a turn, the pressure in fluid line 99 is increased by the power steering mechanism to a point where contacts 66 are bridged. Thus, the leveling switches 58 and 62 will be effective when the guiding wheels of the motor vehicle are being turned and power fluid is being supplied to fluid motor 86. It should be noted that electrical line 84 that connects with contacts 64 and 66 is also connected to the rear wheel leveling switches (not shown) via line 101. It will be apparent to those skilled in the art that the contactor 67 might be made responsive to the turning of the guiding wheels of the motor vehicle in various ways and in a manner other than by connecting the bellows 100 with a power steering system. Thus, the steering shaft 97 could be arranged to actuate a switch when the steering wheel is turned and the switch could operate a solenoid to move contactor 67 into bridging relationship with contact 66. With the system just described and the motor vehicle making a turn, the leveling switches will operate to exhaust air from the air spring on the side of the vehicle that tends to rise and will supply air to the air spring on the side of the vehicle that tends to dip. This insures that the motor vehicle will remain substantially level, in making turns.

From the foregoing it is apparent that the solenoid valves connected with fluid springs 28 and 30 are ineffective to control the supply of air to and from the bellows when the power steering system is not actuated in making a turn and when the vehicle doors are closed. However, when a vehicle door is open or when power fluid is being supplied to the fluid motor of the power steering system, the leveling switches are effective to control the supply and exhaust of air pressure to bellows 28 and 30.

While the form of embodiment of the invention as herein disclosed constitutes a preferred form, it is to be understood that other forms might be adopted as may come within the scope of the claims which follow.

What is claimed is as follows:

1. Apparatus for maintaining a predetermined vertical distance between a sprung and an unsprung part of a motor vehicle irrespective of the load carried by said motor vehicle comprising, a fluid spring connected between said sprung and unsprung parts, a source of fluid pressure, valve means connected between said source and said spring and between said spring and a low pressure exhaust line, said valve means normally blocking communication between said source and said spring and normally blocking communication between said spring and said exhaust line, said valve means being operable to connect said source with said spring and operable to connect said spring with said exhaust line, actuating means for operating said valve means, said actuating means being responsive to relative movement between said sprung and unsprung parts when said movement changes the vertical distance between said parts to a value different from said predetermined distance, and control means for at times rendering said actuating means ineffective to operate said valve means, a power steering system for said motor vehicle including a source of fluid pressure, a control valve and a power actuator connected with the motor vehicle steering mechanism, said control means being associated with said power actuator and being operative in response to the attainment of a predetermined value of fluid pressure within said actuator to render said actuating means effective and operative to render said actuating means ineffective when the pressure in said actuator is below said predetermined value.

2. Apparatus for maintaining a predetermined vertical distance between a sprung and an unsprung part of a motor vehicle comprising, a fluid spring connected between said sprung and unsprung parts, a solenoid operated inlet valve normally biased closed connected between said spring and a source of fluid pressure, a solenoid operated exhaust valve normally biased closed connected between said spring and a lower pressure exhaust line, a source of electrical power for said solenoid valves, a leveling switch connected between said electrical power source and solenoid valves, said switch having a neutral position wherein said solenoid valves are disconnected from said power source, a first position wherein said solenoid inlet valve is connected with said electrical power source for opening said inlet valve and a second position wherein said exhaust solenoid valve is connected with said electrical power source for opening said exhaust valve, means for actuating said leveling switch, said means operating in response to relative movement between said sprung and unsprung parts to actuate said switch to said first position when said movement changes the vertical distance between said parts to a value less than said predetermined distance, and actuating said switch to said second position when said movement changes the vertical distance between said parts to a value greater than said predetermined distance, and a second switch connected in series with said leveling switch and said power source, said second switch being actuated by the opening and closing of a door of said motor vehicle and having an open position when said door is closed and a closed position when said door is open, whereby said leveling switch and solenoid valves are connected with said electrical power source when said door is open and are disconnected from said electrical power source when said door is closed, said second switch also being actuated by steering of said motor vehicle and having an open position when wheels of said vehicle are positioned for straight-ahead movement thus disconnecting said power source from said leveling switch and solenoid valves and having a closed position when wheels of said vehicle are positioned for turning movement thus connecting said power source with said leveling switch and solenoid valves.

3. Apparatus for maintaining a predetermined vertical distance between a sprung and an unsprung part of a motor vehicle comprising, a fluid spring connected between said sprung and unsprung parts, a solenoid operated inlet valve normally biased closed connected between said spring and a source of fluid pressure, a solenoid operated exhaust valve normally biased closed connected between said pring and a low pressure exhaust line, a source of electrical power for said solenoid valves, a leveling switch connected between said electrical power source and solenoid valves, said switch having a neutral position wherein said solenoid valves are disconnected from said power source, a first position wherein said solenoid inlet valve is connected with said electrical power source for opening said inlet valve and a second position wherein said exhaust solenoid valve is connected with said electrical power source for opening said exhaust valve, means for actuating said switch, said means operating in response to relative movement between said sprung and unsprung parts to actuate said switch to said first position when said movement changes the vertical distance between said parts to a value less than said predetermined distance, and actuating said switch to said second position when said movement changes the vertical distance between said parts to a value greater than said predetermined distance, a power steering system for said motor vehicle including a second source of fluid pressure, a control valve, and a power actuator connected with the motor vehicle steering mechanism, a fluid pressure responsive switch connected with said power actuator having a switch portion connected in series with said leveling switch and with said electrical power source, said switch being normally open and closable in response to an increase in pressure in said power actuator.

4. A vehicle suspension system for maintaining a predetermined clearance height between a sprung mass and an unsprung mass of a motor vehicle having a fluid pressure actuated steering means operative on wheels capable of being positioned for straight-ahead vehicle movement and for turning, comprising, a pneumatic spring suspension device connected between said sprung and unsprung masses adjacent each of the wheels, a source of pneumatic pressure, first control means for at times connecting said source with each said spring device and at other times connecting each said spring device with an exhaust line, said control means being operated in response to relative movement between said sprung and unsprung masses when the movement results in a change to other than the predetermined clearance height, and second control means for at times rendering said first control means ineffective to connect said source with said spring device and ineffective to connect said spring device to said exhaust line, and at other times rendering said first control means effective to connect said source and said exhaust line, said second control means being responsive to pressure increase in the steering system from a normally maintained pressure on turning of the wheels of said motor vehicle in making a turn to render said first control means effective to exhaust air from the pneumatic spring device on the side of the vehicle that tends to rise and to supply air to the pneumatic spring device on the side of the vehicle that tends to dip thus insuring that the motor vehicle will remain substantially level at the predetermined clearance height in making turns, said second control means being actuated to render said first control means ineffective when fluid pressure in the steering system decays to the normally maintained pressure.

5. Apparatus for maintaining a predetermined vertical distance between a sprung and an unsprung part of a motor vehicle having at least one door and a steering mechanism capable of being positioned for straight-ahead vehicle movement and for turning, comprising, a fluid spring connected between said sprung and unsprung parts, a source of fluid pressure, first control means for at times connecting said source with said spring and at other times for connecting said spring with an exhaust line, said control means being operated in response to relative movement between said sprung and unsprung parts when said movement varies the distance between said sprung and unsprung parts to a value different from said predetermined distance, and second control means for at times rendering said first control means ineffective to connect said source with said spring and ineffective to connect said spring to said exhaust line, and at other times for rendering said first control means effective to connect said source and spring and effective to connect said spring and said exhaust line, said second control means being responsive to opening and closing of said door and turning movement of the steering mechanism and having a normal position assumed with said motor vehicle door closed and with the steering mechanism positioned to straight-ahead vehicle movement rendering said first control means ineffective, said second control means being actuated by opening of said door or turning movement of the steering mechanism to render said first control means effective.

6. Apparatus for maintaining a predetermined vertical distance between a sprung and an unsprung part of a motor vehicle comprising, a fluid spring connected between said sprung and unsprung parts, a source of fluid pressure, first control means for at times connecting said source with said spring and at other times for connecting said spring with an exhaust line, said control means being operated in response to relative movement between said sprung and unsprung parts when said movement varies the distance between said sprung and unsprung parts to a value different from said predetermined distance, second control means for at times rendering said first control means ineffective to connect said source with said spring and ineffective to connect said spring to said exhaust line, and at other times for rendering said first control means effective to connect said source and spring and effective to connect said spring and said exhaust line, and a fluid pressure actuated steering system, said second control means being actuated by fluid pressure in the said steering system and having a normal position assumed at low pressure value in the steering system rendering said first control means ineffective and actuated by pressure rise in the steering system to render said first control effective.

7. Apparatus for maintaining a predetermined vertical distance between a sprung and an unsprung part of a motor vehicle comprising, a fluid spring connected between said sprung and unsprung parts, a source of fluid pressure, first control means for at times connecting said source with said spring and at other times for connecting said spring with an exhaust line, said control means being operated in response to relative movement between said sprung and unsprung parts when said movement varies the distance between said sprung and unsprung parts to a value different from said predetermined distance, second control means for at times rendering said first control means ineffective to connect said source with said spring and ineffective to connect said spring to said exhaust line, and at other times for rendering said first control means effective to connect said source and spring and effective to connect said spring and said exhaust line, and a fluid pressure actuated steering system, said second control means being actuated by fluid pressure in the said steering system and having a normal position assumed at low-pressure value in the steering system rendering said first control means effective and actuated by pressure rise from the said low-pressure value and return thereto to render said first control means effective and then render the same ineffective.

References Cited in the file of this patent

UNITED STATES PATENTS

| | | |
|---|---|---|
| 1,816,075 | Down | July 28, 1931 |
| 2,762,633 | Gouirand | Sept. 11, 1956 |
| 2,778,656 | May | Jan. 22, 1957 |